United States Patent [19]

Hanlet

[11] Patent Number: 4,587,461
[45] Date of Patent: May 6, 1986

[54] SELF-REGULATING ELECTRONIC BALLAST SYSTEM

[75] Inventor: Jacques M. Hanlet, Loxahatchee, Fla.

[73] Assignee: Intent Patents A.G., Liechtenstein

[21] Appl. No.: 580,624

[22] Filed: Feb. 23, 1984

Related U.S. Application Data

[63] Continuation-in-part of Ser. No. 500,147, Jun. 1, 1983, Pat. No. 4,503,362.

[51] Int. Cl.⁴ .................................... H05B 37/02
[52] U.S. Cl. ............................. 315/224; 315/278; 315/DIG. 7
[58] Field of Search ............... 315/278, 224, DIG. 7

[56] References Cited

U.S. PATENT DOCUMENTS

| | | | |
|---|---|---|---|
| 3,619,713 | 11/1971 | Biega | 315/224 |
| 4,075,476 | 2/1978 | Pitel | 315/278 |
| 4,259,616 | 3/1981 | Smith | 315/278 |
| 4,277,726 | 7/1981 | Burke | 315/224 |
| 4,353,009 | 10/1982 | Knoll | 315/278 |

Primary Examiner—Harold Dixon
Attorney, Agent, or Firm—Morton J. Rosenberg

[57] ABSTRACT

This invention provides for a self-regulating electronic ballast system (10) which includes a power source (12) for actuating at least one gas discharge tube (66). The self-regulating electronic ballast system (10) includes a filter circuit (11) connected to the power source (12) for maintaining a substantially smooth direct current voltage signal as well as for suppressing harmonic frequencies generated by the electronic ballast system (10). Induction circuitry (15) is coupled to the filter circuit (11) and includes a tapped primary winding (42) for generating a voltage across the gas discharge tube (66) responsive to a regulated current. A switching network (13) which is feedback coupled to the induction circuitry (15) establishes the regulated current and the switching network (13) includes a regulation control circuit (17) for maintaining the power output of the gas discharge tube (66) at a predetermined and substantially constant value.

30 Claims, 1 Drawing Figure

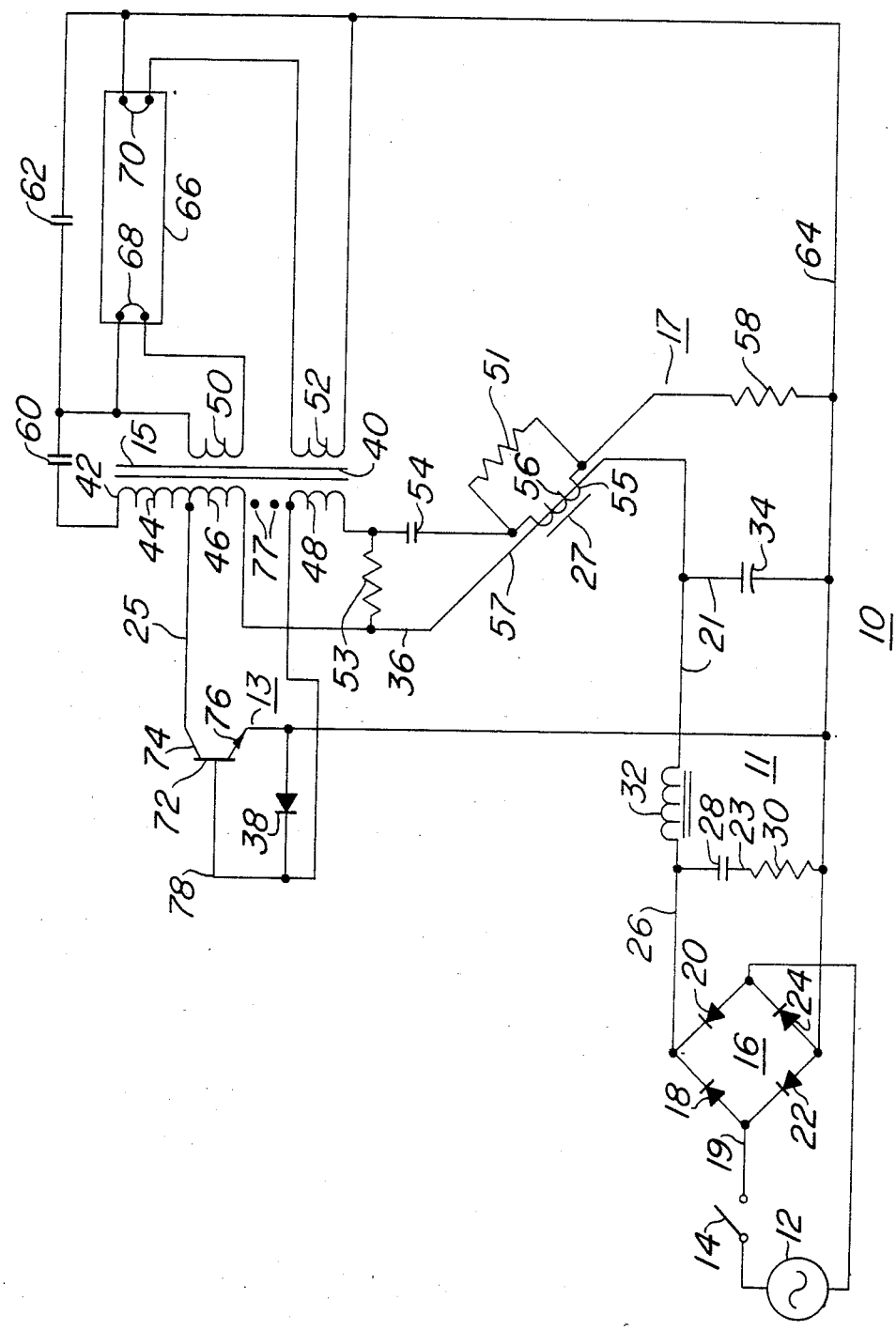

SELF-REGULATING ELECTRONIC BALLAST SYSTEM

REFERENCE TO RELATED APPLICATIONS

This invention is a Continuation-in-Part of U.S. patent application Ser. No. 500,147, having a filing date of 1 June 1983, entitled "FREQUENCY STABILIZED AUTOMATIC GAIN CONTROLLED BALLAST SYSTEM", now U.S. Pat. No. 4,503,362 issued March 5, 1985.

BACKGROUND OF THE INVENTION

1. Field of the Invention

This invention is directed to an electronic ballast system for fluorescent or gas discharge tubes. In particular, this invention relates to automatic gain control ballast systems for fluorescent tubes. More in particular, this invention relates to a ballast system which provides for frequency control mechanisms utilizing inductance characteristics of an inverter transformer to allow for a substantial frequency stabilization. Still further, this reference directs itself to a transistor switching mechanism which is feedback coupled to an induction circuit for establishing a regulated current for a gas discharge tube independent of the gain of a transistor used in a particular ballast system unit. Further, this invention directs itself to an electronic ballast system where there is provided a transistor switching network including a regulation control circuit for maintaining the power output of a gas discharge tube at a predetermined and substantially constant value. Still further, this invention relates to an electronic ballast system having a toroidal transformer to provide a predetermined variable inductance for regulating a power output to a gas discharge or fluorescent tube. Additionally, this invention pertains to an electronic ballast system which is transistorized and where the current gain of various transistors range over a wide value range from one system unit to another and provides for electrical circuitry which will maintain the gas discharge tube light output fluctuation to a minimum value.

2. Prior Art

Electronic ballast systems for gas discharge or fluorescent tubes are known in the art. However, in some prior art electronic ballast systems, no provision is made for frequency stabilization of the circuit. Thus, in such prior art electronic ballast system circuits, when a gas discharge tube is removed from the circuit, there is a deleterious flickering of the remaining gas discharge tubes, or in some cases, a complete breakdown of the visible light from the remaining gas discharge tubes.

In other prior art electronic ballast systems, the light output of the gas discharge tubes are highly dependent upon the gain of the transistors used in the circuits. In such prior art where the transistor gains between one unit and another vary over a great range, the light output from the gas discharge tube fluctuates by large amounts. In such prior art systems, additional circuitry must be added to such prior art electronic ballast systems to maintain the light output fluctuation as constant as possible between different units.

In the alternative, in such prior art electronic ballast systems, in order to maintain the light output fluctuation of the gas discharge tubes to a minimum value, the transistors used in the circuit must be matched within very restrictive ranges to obtain a substantially constant transistor gain from one unit to the next. Such procedures increase the cost of the electronic ballast systems, as well as providing for additional electronic elements, which increase both labor and capital investment in such electronic ballast systems.

By increasing the electrical components used in prior art electronic ballast systems to maintain the gas discharge tubes in operation, there is a responsive increase in the manufacturing costs of such prior art electronic ballast systems and a reduction in the reliability of these ballast systems.

SUMMARY OF THE INVENTION

A self-regulating electronic ballast system having a power source for actuating at least one gas discharge tube with a regulated current to maintain the gas discharge tube output and input power at a predetermined value. The self-regulating electronic ballast system includes a filter circuit connected to the power source for maintaining a substantially smooth direct current voltage signal as well as for suppressing harmonic frequencies generated by the electronic ballast system. Further, the subject electronic ballast system includes an induction network coupled to the filter circuit and having a tapped primary winding for generating a voltage across the gas discharge tube responsive to the regulated current. A switching network is included which is feedback coupled to the induction circuit for establishing the regulated current with the switching network including a regulation circuit for maintaining the power output of the gas discharge tube at a predetermined and substantially constant value.

BRIEF DESCRIPTION OF THE DRAWINGS

The FIGURE is an electrical schematic diagram of the self-regulating electronic ballast system.

DESCRIPTION OF THE PREFERRED EMBODIMENTS

Referring to the FIGURE, there is shown self-regulating electronic ballast system 10 having power source 12 for actuation of at least one gas discharge tube 66. Gas discharge tube 66 may be a standard fluorescent type system having first and second filaments 68 and 70 respectively. Self-regulating electronic ballast system 10 is provided to maintain the output and input power of gas discharge tube 66 at a substantially predetermined value which is relatively constant during operation and substantially constant and independent of electrical component tolerances from one electronic ballast system 10 to another.

In overall concept, self-regulating electronic ballast system 10 is provided for maximization of efficiency of light output from gas discharge tube 66 with respect to a power input from power source 12. Additionally, self-regulating electronic ballast system 10 provides for a substantially constant light output in the order of approximately ±3.0% regardless of the voltage variation by virtue of the output of gas discharge tube 66 being responsive to a pulsating driving current as opposed to an input voltage.

As will be described in following paragraphs, electronic ballast system 10 provides for a self-regulation control which eliminates the need for adjusting or preselecting transistors of specific gain, in order to provide a relatively constant light output substantially independent of manufacturing tolerances associated with the manufacture of contained electronic components.

Additionally, as will be described in following paragraphs, self-regulating electronic ballast system 10 provides for a frequency control mechanism using the inductive characteristics of inverter transformer 40 allowing for frequency stabilization and having the advantage of permitting electronic ballast system 10 to operate in a normal manner without bothersome visual flickering.

Particularly, operation of gas discharge tube 66 is maintained at a minimum level due to the higher efficiency obtained by self-regulating electronic ballast system 10. Of importance to the reliability of system 10 is the minimization of electrical components coupled with the simplicity of the circuitry associated with ballast system 10. This concatenation of elements has the effect of increasing reliability of self-regulating electronic ballast system 10 while simultaneously maximizing the operating lifetime of gas discharge tube 66.

Referring now to the FIGURE of electronic ballast system 10, having power source 12 for actuating gas discharge tube 66, such includes filter circuit 11 coupled to power source 12 for establishing a substantially direct current voltage signal and suppressing harmonic frequencies generated by electronic ballast system 10.

In still further overall concept, self-regulating ballast system 10 includes induction circuitry 15 which is electrically coupled to filter circuit 11 for generating a voltage across gas discharge tube 66 responsive to a pulsating driving current established by switching network 13. As will be detailed in following paragraphs, induction circuitry 15 is coupled to regulation control circuit 17 for maintaining a gain value of switching network 13 to a predetermined level. Thus, filter circuit 11 is connected to power source 12 for (1) maintaining a substantially smooth direct current voltage signal; and, (2) suppressing harmonic frequencies generated by electronic ballast system 10.

Induction circuitry 15 also includes base drive winding 48 for generating a switching signal. Switching network 13 generates a pulsating driving current responsive to the switching signals generated in base driving winding 48.

As will be seen in following paragraphs, induction circuitry 15 is coupled to filter circuit 11 and includes tapped primary winding 42 for generating a voltage across gas discharge tube 66 responsive to a regulated current.

Referring further to the FIGURE, there is shown power source 12 to provide an electrical power input for self-regulating electronic ballast system 10. In the embodiment shown in the FIGURE, power source 12 may be an AC power source of standard voltage such as 120, 240, 270 volts, or any acceptable standardized power voltage generated at approximately 50.0 or 60.0 Hz. In broad general concept, power source 12 may be a DC power electrical source applied internal or external to self-regulating electronic ballast system 10 in a manner well-known in the art by removal of some elemental circuitry and filtering elements to be described in following paragraphs.

For the purposes of illustration, power source 12 will in the following paragraphs be designated as a 210–240 volt, 50.0 Hz, AC power source, and will be used in the embodiment to be described.

Power for system 10 is supplied by power source 12 to switch 14 which may be a standard switch element such as a single pole, single throw switch mechanism. Power is input to power line 19 and then to rectification circuit 16 which is used for providing full-wave rectification of the power source AC voltage.

Rectification circuit 16 may be a full-wave bridge circuit well-known and standard in the art. In the embodiment illustrated, full-wave bridge circuit 16 is formed of diode elements 18, 20, 22 and 24 for providing the necessary rectification of AC voltage from power source 12. Diode elements 18, 20, 22 and 24 may be one of a number of standard diode elements, and in one form of self-regulating ballast system 10, diode elements 18, 20, 22 and 24 have a standardized designation of 1N4005.

Rectification for full-wave bridge circuit 16 provides a pulsating DC voltage signal passing on output line 26 which is applied to filter network 11. Filter network 11 filters the pulsating DC voltage passing from rectification circuit 16, and is electrically connected to bridge circuit 16 by output line 26. In overall concept to be further described in following paragraphs, filter circuit or network 11 includes filter 21 for averaging out the pulsating DC voltage signal to provide a substantially continuous smooth signal for system 10. Rectification bridge circuit 16 is coupled to return line 64 which is the return path for the DC supply for the opposing ends of bridge circuit 16, providing DC power input to filter network 11.

Thus, self-regulating electronic ballast system 10 has been shown to include rectification circuit 16 for providing full-wave rectification of power source 12 AC voltage, with rectification circuit 16 being coupled to AC power source 12 and filter circuit 11. Further, for the embodiment herein described, rectification circuit 16 is provided as a full-wave bridge circuit.

Smoothing filter 21 of filter network 11 includes choke element 32 and shunt capacitor 34. Choke element 32 is coupled on a first end in series relation to rectification circuit 16 and to shunt capacitor 34 on an opposing end. As is seen, shunt capacitor 34 is coupled in parallel relation with the output of filter network 11. Shunt capacitor 34 is connected on a first end to a second end of choke element 32 and filter output line 36, and coupled on the opposing end to DC return line 64.

As can be seen, choke element 32 is further coupled on one end to output line 26 and on the opposing end to shunt capacitor 34. Shunt capacitor 34 is connected to choke element 32 and to filter output or power output line 36, as well as ground return line 64.

In combination, shunt capacitor 34 and choke element 32 function to average out the 100.0 Hz pulsating DC voltage supplied by full-wave bridge circuit 16. Additionally, this combination substantially maintains the current draw at an average value without creating a power factor which is either unacceptably leading, or unacceptably lagging. Deleterious lead or lag may be found where a large capacitance is used, or a large inductance, as the sole filtering means for smoothing a pulsating DC voltage.

For purposes of illustration, in the event choke elexent 32 were not incorporated within self-regulating electronic ballast system 10, shunt capacitor 34 would draw an increased current commonly referred to as a surge current on each cycle as capacitor 34 began to charge. By incorporation of choke element 32, the inductance stores energy during each cycle to supply current for initial charging of shunt capacitor 34 which provides a substantially smooth, average current as seen by power source 12.

In the embodiment herein provided, choke element 32 may be an inductor approximately 1.7 henry, with a resistance of 56.0 ohms, and shunt capacitor 34 is a commonly available 100.0 microfarad, 250.0 volt electrolytic capacitor.

Filter network 11 includes harmonic filter circuit 23 for substantially reducing harmonic frequencies generated by induction circuitry 15. Harmonic filter circuit 23 is a network of capacitor 28 and resistor 30 in series relation connected in parallel with the output of bridge circuit 16. Harmonic filter resistor 30 and harmonic filter capacitor 28 of harmonic filter circuit 23 have predetermined values which have been selected in a manner to tune the network for substantially reducing harmonic oscillations which might otherwise be coupled back to power source 12. The tuning of harmonic filter circuit 23 has been designed to provide significant reduction in amplitude of at least the first five harmonic frequencies coupled to the DC supply of ballast system 10. As is typical in filters of this nature, harmonic frequencies which are multiples of these first five harmonic frequencies are also reduced.

Harmonic filter circuit 23 includes harmonic filter capacitor 28 which is coupled in series relation to harmonic filter resistor 30. Harmonic filter capacitor 28 is connected on a first end to power output line 26 and on the opposing end to harmonic filter resistor 30. Harmonic filter resistor 30 is connected on its first end to filter capacitor 28 and on the opposing end to return line 64. Thus, harmonic filter circuit 23 has harmonic filter capacitor 28 connected in series relation to harmonic filter resistor 30 and the series combination is connected in shunt relation to bridge circuit 16.

In the embodiment herein provided, harmonic filter 28 is approximately a 1.0 microfarad, 400.0 volt, Mylar type capacitor, and harmonic filter resistor 30 is approximately a 240.0 ohm, 2.0 watt resistor.

Self-regulation control circuitry 17 is coupled between return line 64 and inverter network 15. Self-regulation control circuitry 17 includes first capacitor 54, toroid transformer 56, and current limiting resistor 58. Current limiting resistor 58 is coupled on a first end to return line 64 and on a second end to first winding 55 of toroid transformer 56. First winding 55 of toroid transformer 56 is coupled on a first end to current limiting resistor 58 and on a second end to base coupling capacitor 54. Base coupling capacitor 54 is coupled on one end to first winding 55 of toroid transformer 56 and on the opposing end to base driving winding 48 of induction circuit 15.

Although not important to the inventive concept as herein described, current limiting or damping resistor 58 may have a value approximating 2.0–3.0 ohms and having a dissipation rating of approximately 0.25 watt. Toroid transformer 56 may have a core material which is Ferroxcube 3B7266T125, or 3B7-266CT125, with first winding 55 having sixteen turns of number 28.0 wire, a second winding 57 of a single turn formed by DC power input or filter output line 36 passing through the axis of the toroid core. Base coupling capacitor 54 may be a 0.15 microfarad, 100.0 volt Mylar type capacitor.

The series combination of current limiting resistor 58, first winding 55 of toroid transformer 56, and base coupling capacitor 54 provides for return paths for the base drive signal of switching network 13 subsequent to self-regulating electronic ballast system 10 going into an oscillating phase.

Self-regulating electronic ballast system 10 further includes switching network 13 which is feedback coupled to induction circuitry 15 for establishing a regulated current. As will be seen in following paragraphs, switching network 13 includes a regulation mechanism for maintaining the power output of gas discharge tube 66 at a predetermined and substantially constant value.

Switching network 13 includes transistor 72 connected in feedback relation to bias control winding 48 of inverter transformer 40. This coupling allows switching of a current signal responsive to a bias signal produced. Referring to bias control winding 48 of inverter transformer 40, current entering the first end of bias control winding 48 passes through winding 48 to base element 78 of transistor 72. Transistor 72 includes respectively base element 78, collector element 74, and emitter element 76. Transistor 72 may be of the NPN type which is commercially available and in one commercially purchased transistor, has a designation of MJE13005.

It is to be understood that self-regulating electronic ballast system 10 is designed to provide a constancy in visual light output, as well as power input to gas discharge tube 66 by maintaining the current of collector element 74 substantially constant independent of the current gain of a particular transistor 72 used in electronic ballast system 10. The subject self-regulating electronic ballast system 10 is particularly designed for gas discharge tubes 66 where transistor 72 "on" and "off" time intervals are not necessarily substantially equal. It has been determined that the light output should not fluctuate more than ±3.0% while the current gain of transistors 72 used in system 10 may vary in the extreme between 10.0 and 60.0. It is to be further understood that although system 10 as shown in the illustrated embodiment operates a single gas discharge tube 66, the principle as herein described is general in concept and may be used in dual systems since in such cases, transistor current gains would not necessarily have to be matched by pairs. Initially a positive voltage provided to base element element 78 by resistor element 53 assures a small but sufficiently initiating current flow through base element 78 for initiation of conduction through transistor 72. A value of 1.0 megaohm has been used successfully for resistor 53.

When transistor 72 goes into a conducting or "on" state, current from power source 12 flows through bridge circuit 16 and corresponding filter network 11 to DC output line 36. DC output line 36 is coupled to primary winding 42 of inverter transformer 40 and passes through the axis of the core of toroidal transformer 56. Such current passes through first section 46 of primary winding 42 to tap line 25 which is coupled to collector element 74 of switching transistor 72.

Current flows through transistor 72 from collector 74 to emitter element 76 and then from emitter element 76 through return line 64. The increasing collector current established by switching transistor 72 induces a voltage in bias control winding 48 which is coupled to base element 78 of transistor 72. Base current flows from base element 78 to emitter element 76 in transistor 72 and from emitter element 78 to return line 64.

In completion of the circuit, the current flows through current limiting resistor 58, first winding 55 of toroid transformer 56, and base coupling capacitor 54. The series combination of elements as aforementioned creates a pulse type base drive for switching transistor 72 "on" and "off" for predetermined periods of time.

The pulse which drives switching transistor 72 controls the frequency of operation of self-regulating electronic ballast system 10. At the terminating point of this pulse, transistor 72 goes to an "off" state since the pulse differentiation through capacitor 54 supplies a negative signal to base element 78 which is limited in value magnitude by diode 38. The energy stored in primary winding 46 of inverter transformer 40 then discharges to coupling capacitor 60 and to fluorescent or gas discharge tube 66. This current induces a voltage in bias control winding 48 which then switches transistor 72 back to an "on" state in order that the cycle may be repetitive.

Switching network 13 further includes switching diode 38 which is coupled in parallel relation to the base-emitter junction of transistor 72 and as is seen, the polarity of switching diode 38 is provided to prevent negative voltage from damaging transistor 72. Switching diode 38 may be a commercially available 1N4005 type and is connected such that its polarity is opposite to that formed by the base-emitter junction of transistor 72.

Primary winding 42 of inverter transformer 40 is a tapped winding which is connected in an auto-transformer configuration such that the voltage induced in primary winding second section 44 is coupled in series relation and adds to the voltage across primary winding first section 46. The total voltage across primary winding 42 is coupled to coupling capacitor 60 which is connected in series relation with primary winding 42. Obviously, as seen in the FIGURE, coupling capacitor 60 is coupled on a first end to primary winding 42 of inverter transformer 40 and is further coupled on a second end to first filament 68 of gas discharge or fluorescent tube 66, as well as to a first end of protection capacitor 62.

Protection capacitor 62 is coupled in parallel relation with gas discharge tube 66 and in series relation to output coupling capacitor 60 in order to prevent a generation of excessive voltage values from the circuit of system 10. For purposes of the embodiment herein described, capacitor 62 may be a 0.003 microfarad, 1.0 Kilovolt Mylar capacitor.

Inverter transformer 40 includes secondary windings 50 and 52 which provide a filament voltage for fluorescent tube 66. First filament drive winding 50 is coupled in parallel relation to first filament 68 of fluorescent tube 66 and second filament drive winding 52 is coupled in parallel relation to second filament 70 of gas discharge tube 66. A first end of second filament drive winding 52 is also coupled to return line 64.

Thus, when coupling capacitor 60 couples the discharge voltage from primary winding 42 to first filament 68 of gas discharge tube 66, a current is able to flow through gas discharge tube 66 from first filament 68 to second filament 70 and then through return line 64 back to power source 12.

Referring still to the FIGURE of self-regulating electronic ballast system 10, it is seen that when this system is in oscillation and transistor 72 is in an "on" state, the collector current which is the system driving current flows from power source 12 through rectification circuit 16 and filter network 11 through line 36. DC power output line 36 passes through the axis of toroidal transformer 56 and is coupled to one end of primary winding 42 of inverter transformer 40.

This driving current flows through first section 46 of primary winding 42 to tap line 25 where it is coupled to collector element 74 of switching transistor 72. Transistor 72 being in an "on" state allows current to pass from collector element 74 to emitter element 76 and back to the return of the power supply through line 64. This current being of an increasing nature, induces a voltage in bias control winding 48 which is wound in a direction to produce a voltage on base element 78 of transistor 72 which is positive with respect to emitter element 76 and greater than approximately 0.7 volts which is required to keep transistor 72 in an "on" state, thus, the voltage produced in bias control winding 48 reinforces the "on" condition of transistor 72.

The collector current increases in a substantially linear manner until a maximum value is reached. The maximum value is a function of the power supply voltage and the impedance of the collector circuit. Thus, when the collector current flows through first section 46 of primary winding 42, during the transistor "on" state, a magnetic flux is generated within the core of inverter transformer 40 which induces the voltages in all of the secondary windings of inverter transformer 40 and in second section 44 of primary winding 42. As previously stated, the induced voltage in secondary winding 48 reinforces the "on" condition or state and provides the base drive current.

The induced voltages in secondary windings 50 and 52 provide the heater current for respective filaments 68 and 70 of gas discharge tube 66. Since primary winding 42 of inverter transformer 40 is coupled in a step-up auto-transformer configuration, the induced voltage of second section 44 of primary winding 42 is added to the voltage which appears across first section 46. The aforementioned summation of voltages is then coupled through coupling capacitor 60 to first filament 68 of gas discharge tube 66 for generation of visible light output from gas discharge tube 66.

The generation of induced voltages occurs as the collector current is increasing towards its maximum value, and as is clear, as the current reaches the maximum value, the rate of change is substantially zero, and thus, the induced secondary voltages are correspondingly reduced to substantially zero.

When the maximum current is reached, no transformer action takes place, and transistor 72 which was in the "on" state no longer receives base drive signals from base drive winding 48 of inverter transformer 40 and therefore transistor 72 turns to an "off" condition.

When transistor 72 is turned to an "off" state, the collector current which was flowing through first section 46 of inverter transformer primary winding 42 terminates abruptly. The rapid change in collector current induces voltages again in second section 44 of inverter transformer primary winding 42 and the corresponding secondary windings 50, 52, and 48. As is known from classical theory, the polarity of the voltages induced by the rapid collapse of the collector current is such that transformer 40 attempts to maintain the direction of the original current in winding 46. Due to the direction of current flow in windings 46 and 48 as indicated by nomenclature dots 77, the voltage induced in bias control winding 48 of inverter transformer 40 is of the opposite polarity as previously described when the collector current was flowing. Thus, a negative signal on base element 78 with respect to emitter 76 is generated and transistor 72 is switched to an "off" condition.

As has been described in previous paragraphs, this allows for a repetitive cycle with a collector current waveform which closely approximates a sawtooth, where there is a substantially linearly increasing period followed by a rapid decrease to substantially a zero value and then a substantially linearly increasing current back to the peak value.

The frequency of oscillation is determined by the combined characteristics of the core, the number of turns of first section 46 of primary winding 42, and the current flowing through first section 46 of primary winding 42. Thus, oscillation frequency is much less dependent on supply voltage than that which is known in the prior art and produces a visible light output from gas discharge tube 66 which is substantially constant and having a minimization of visual flicker even when there exists substantially large variations in supply voltage.

In one working and operable embodiment of self-regulating electronic ballast system 10, inverter transformer has a ferrite core using Ferroxcube 3C8-3019 with a 0.125 millimeter gap to reduce the likelihood that inverter transformer 42 will go into a saturating mode. Primary winding 42 is formed of 123.0 turns of number 24.0 wire and secondary windings 50, 52 and 48 are each 1.0 turns of number 24.0 wire.

Of great importance to the subject invention concept, it is desired to maintain a relatively uniform gain of transistors used in self-regulating electronic ballast system 10 such that light output may be relatively consistent from one particular unit to another within a range of approximately ±3.0%. However, due to normal manufacturing techniques known in the industry, the gain of transistors 72 may vary between 10.0 to 50.0 or greater. Thus, a self-regulation control is a requirement and an advantage over having to manually adjust gain control elements or in the alternative to preselect devices within a small tolerance in order to obtain an output of light which is relatively constant from one electronic ballast system 10 to another.

Self-regulating electronic ballast system 10 makes use of the concept of a variable inductance in the form of toroidal core 27 wound with 16.0 turns in which the base current passes. Line 36 passes through the axis of the toroidal core 27 which carries the collector current of transistor 72. The direction in which current flows through the two windings is such that their respective magnetic fields are additive within toroidal core 27 of toroidal transformer 56.

Therefore, the inductance which is seen in first winding 55 of toroidal transformer 56 is a function of both the base current and the collector current multiplied by the respective turn ratios and the permeability of magnetic core 27 depends on the base and current.

In actual practice, the inductance variations of second winding 57 of toroidal transformer 56 may be neglected since second winding 57 is formed of only a single turn and winding 57 inductance is relatively low as well as coupled in series with the inductance of first section 46 of primary winding 42. The inductance of second winding 57 has been found not to be significant when compared with the inductance of first section 46 of primary winding 42 which is substantially larger in absolute value.

In order to insure oscillation within self-regulating electronic ballast system 10 of switching transistor 72, bias control winding 48 is specifically designed to supply sufficient voltage to turn "on" transistor 72 of the lowest gain which may be expected to be obtained from a manufacturer of these systems. In this manner, it is assured that transistor 72 will go to an "on" state and reach saturation and thus, the base to emitter voltage will be at least the 0.7 volts required to switch transistor 72 to the saturation state.

Regardless of the gain of transistor 72 used in self-regulating electronic ballast system 10, the collector voltage and collector circuit impedance is substantially the same and thus, the substantially same collector current will flow whether a transistor with a gain of 10.0 or 50.0 is being utilized. Therefore, since the base current is a function of the collector current divided by the gain of transistor 72, it is seen that the base current must change if a transistor 72 of different gain value is to be used and function properly in self-regulating electronic ballast system 10. Where the base current changes, then an electronic element in the base circuit must change its impedance value which is the function of self-regulating circuit 17 and primarily first winding 55 of toroidal transformer 56.

In order to achieve self-regulation, the design of toroidal transformer 56 is such that the maximum permeability of core 27 is reached with a transistor whose gain is at a maximum expected value. Likewise, the inductance of first winding 55 of toroidal transformer 56 will therefore be at a maximum and hence a minimum current will flow through the base circuit for transistor 72.

The impedance of a winding having a magnetic core is related to the number of turns of the winding and current flowing therethrough as well as inversely to the length of the magnetic path in the core. The point of operation may be adjusted by either changing the size of the toroid or by inserting parallel resistor 51 in parallel relation with toroid first winding 55 for adjustment of the corresponding exciting field. A value of 270.0 ohms has been successfully used for parallel resistor 51.

Thus, with first winding 55 of toroidal transformer 56 being at a maximum value of inductance, its impedance is significantly larger than the impedance of current limiting resistor 58 and base coupling capacitor 54 such that the controlling factor is limiting the current to base element 78 of transistor 72. With transistor 72 having a maximum gain value, little current is needed and for example, if the gain or beta of transistor 72 is 50.0, then it is seen that the base current is 1/50th of the collector current.

However, the voltage induced in base drive winding 48 has been designed to turn "on" a transistor of lower gain and therefore, there is excess energy to be dissipated in the base circuit of transistor 72. The excess energy is stored in first winding 55 of toroidal transformer 56. This impedance of first winding 55 is primarily inductive as opposed to resistive, and there is little dissipation in the form of heat, and thus, there is provided an efficient means of dissipating the excess energy which is liberated when transistor 72 is in an "off" state.

In opposition, when a transistor of low gain is used in self-regulating electronic ballast system 10, the base current obviously must increase and the permeability of core 27 of toroidal transformer 56 shifts in a downward direction to a lower value than would be measured for a high gain transistor and the inductance is less than was seen with a high gain transistor. Thus, a series impedance is reduced which allows a greater base current to flow and compensates for the lower gain transistor 72 being used in system 10.

Hence, there is provided a variable inductance in first winding 55 of toroidal transformer 56 which is essentially the self-regulating element and allows sufficient base current to switch transistor 72 to an "on" state regardless of the gain or beta of transistor 72. In this manner, the output of self-regulating electronic ballast system 10 remains relatively constant within a ±3.0% margin when comparing one system to another with extreme efficiency and without unnecessary dissipation of excess heat. Thus, as has hereinbefore been described, there is provided a relatively simple and efficient means of self-regulation for electronic ballast system 10 without the need to manually adjust component values for preselected electronic transistor devices within specific gain values.

As has been previously described, self-regulating electronic ballast system 10 thus provides for switching network 13 which is feedback coupled to induction circuit 15 for establishing a regulated current. Switching network 13 includes self-regulation control circuitry 17 for maintaining the power output of gas discharge tube 66 at a predetermined and substantially constant value.

Regulation control circuit 17 further includes toroidal transformer 56 for providing a predetermined variable inductance for regulating a power output to gas discharge tube 66. Toroidal transformer 56 includes first toroidal transformer winding 55 and second toroidal transformer winding 57. Base coupling capacitor 54 is coupled on opposing ends thereof to toroidal transformer first winding 55 and induction circuit 15 for substantially blocking a direct current from resistor 53 which may only flow through base 78 to emitter 76. Current limiting resistor 58 is connected on opposing ends thereof in series relation with toroidal transformer first winding 55 and emitter element 76 of transistor 72 through return line 64. Current limiting resistor 58 substantially limits the current value input to base element 78 of transistor 72 when the inductance of toroidal transformer first winding 55 is at a substantially minimum value.

As has been stated, toroidal transformer 56 provides for the predetermined variable inductance which regulates the power input to gas discharge tube 66. Such toroidal transformer 56 has a toroid core configuration of ferrite material for varying the inductance in first winding 55 responsive to a particular gain value of transistor 72. Both first and second windings 55 and 57 of toroidal transformer 56 have a predetermined number of turns as hereinbefore described, and are wound in a manner such that the respective magnetic flux of first and second windings 55 and 57 is additive within toroid core 27. In the manner as hereinbefore described, second winding 57 of toroidal transformer 56 couples a variable inductance control current signal to first winding 55 of toroidal transformer 56, responsive to a predetermined value of magnetic flux components in the toroidal core of toroidal transformer 56. Further, first winding 55 of toroidal transformer 56 couples a variable inductance control signal to the toroidal core of toroidal transformer 56.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A self-regulating electronic ballast system having a power source for actuating at least one gas discharge tube with a regulated current to maintain said gas discharge tube output and input power at a predetermined value, comprising:
    (a) filter means connected to said power sourece for (1) maintaining a substantially smooth direct current voltage signal, and (2) suppressing harmonic frequencies generated by said electronic ballast system;
    (b) induction means coupled to said filter means and having a tapped primary winding providing an auto-transformer configuration for generating a voltage across said gas discharge tube responsive to said regulated current, said induction means having a multiplicity of secondary windings said multiplicity of said secondary windings including a trigger control winding for generating a control current; and,
    (c) switching means being feedback coupled to said induction means for establishing said regulated current, said switching means including regulation means for maintaining said power output of said gas discharge tube at a predetermined and substantially constant value, said regulation means including a toroidal transformer having (1) a first winding coupled in series relation with said trigger control winding and said switching means for modifying said control current, and, (2) a second winding coupled to said tapped primary winding of said induction means and said filter means in series relation for feedback to said first winding of said toroidal transformer.

2. The self-regulating electronic ballast system as recited in claim 1 where said switching means includes transistor means for said regulated current, said transistor means including a base element, a collector element, and an emitter element coupled to said power source.

3. The self-regulating electronic ballast system as recited in claim 2 where said toroidal transformer second winding is connected to said induction means tapped primary winding and said emitter element of said transmitter means in series relation each with respect to the other.

4. The self-regulating electronic ballast system as recited in claim 3 where said toroidal transformer provides a predetermined variable inductance for regulating a power output to said gas discharge tube.

5. The self-regulating electronic ballast system as recited in claim 4 where said regulation means includes a base coupling capacitor connected on opposing ends thereof to said toroidal transformer first winding and said trigger control winding of said induction means for substantially blocking a direct current component signal.

6. The self-regulating electronic ballast system as recited in claim 4 where said regulation means includes a current limiting resistor coupled on opposing ends thereof in series relation with said toroidal transformer first winding and said emitter element of said transistor means.

7. The self-regulating electronic ballast system as recited in claim 6 where said current limiting resistor limits a current value input to said base element of said transistor means when said toroidal transformer first winding inductance is at a substantially minimum value.

8. The self-regulating electronic ballast system as recited in claim 5 where said trigger control winding of said induction means generates a switching control signal, said trigger control winding being coupled to said base coupling capacitor on a first end and to said base element of said transistor means on a second end thereof.

9. The self-regulating electronic ballast system as recited in claim 8 where said induction means includes an output coupling capacitor coupled on opposing ends thereof to said gas discharge tube and said primary winding of said induction means for blocking said direct current voltage signal from said filter means while simultaneously passing therethrough a pulsating induced signal from said primary winding of said induction means.

10. The self-regulating electronic ballast system as recited in claim 9 where said induction means includes a protection capacitor coupled in parallel relation with said gas discharge tube and in series relation with said output coupling capacitor, said protection capacitor for preventing generation of excessive voltage values when said gas discharge tube is removed from said electronic ballast system.

11. The self-regulating electronic ballast system as recited in claim 9 where said output coupling capacitor is of a predetermined capacitive value for discharging said voltage from said auto-transformer configuration of said primary winding to said gas discharge tube.

12. The self-regulating electronic ballast system as recited in claim 9 where said tap of said primary winding is coupled to said collector element of said transistor means.

13. The self-regulating electronic ballast system as recited in claim 8 where said toroidal transformer of said regulation means provides a predetermined variable inductance to regulate said power input to said gas discharge tube.

14. The self-regulating electronic ballast system as recited in claim 13 where said toroidal transformer includes a toroid core configuration of ferrite material for varying the inductance in said first winding of said toroidal transformer responsive to a particular gain value of said transistor means.

15. The self-regulating electronic ballast system as recited in claim 14 where said first and second windings each of which having a predetermined number of turns are wound in a manner that the respective magnetic flux of said first and second windings is additive within said toroid core, said first and second winding magnetic fluxes being generated by said base element current and said collector element current.

16. The self-regulating electronic ballast system as recited in claim 15 where said first winding of said toroidal transformer has a greater number of turns than said second winding of said toroidal transformer.

17. The self-regulating electronic ballast system as recited in claim 8 where two of said multiplicity of said secondary windings of said induction means are connected to opposing filaments of said gas discharge tubes.

18. The self-regulating electronic ballast system as recited in claim 13 where said second winding of said toroidal transformer couples a variable inductance control current signal to said first winding of said toroidal transformer responsive to a predetermined value of a magnetic flux component in said toroidal core of said toroidal transformer.

19. The self-regulating electronic ballast system as recited in claim 18 where said first winding of said toroidal transformer couples a variable inductance control current signal to said toroidal core of said toroidal transformer.

20. The self-regulating electronic ballast system as recited in claim 1 where said filter means includes:
 (a) harmonic filter means for substantially reducing harmonic frequencies generated by said induction means; and,
 (b) smoothing filter means coupled in parallel relation to said harmonic filter means for maintaining said substantially smooth direct current voltage signal.

21. The self-regulating electronic ballast system as recited in claim 20 where said smoothing filter means includes a series inductor coupled in series relation to said power source and said induction means.

22. The self-regulating electronic ballast system as recited in claim 21 where said smoothing filter means includes a shunt capacitor coupled to said series inductor and said power source, said shunt capacitor being coupled in parallel relation with an output of said filter means.

23. The self-regulating electronic ballast system as recited in claim 21 where said harmonic filter means includes a harmonic filter capacitor, said harmonic filter capacitor being coupled to said series inductor and said power source.

24. The self-regulating electronic ballast system as recited in claim 23 where said harmonic filter means includes a harmonic filter resistor being coupled in series relation to said harmonic filter capacitor.

25. The self-regulating electronic ballast system as recited in claim 1 where said switching means includes a transistor element having a collector, base and emitter, said transistor element being coupled to said power source, said regulation means being coupled to said induction means and said transistor element.

26. The self-regulating electronic ballast system as recited in claim 25 where said switching means includes a diode coupled in parallel relation to said transistor element base and said emitter.

27. The self-regulating electronic ballast system as recited in claim 26 where said switching means diode includes a polarity opposite to a polarity of a junction of said transistor element base and transistor element emitter.

28. The self-regulating electronic ballast system as recited in claim 1 where said power source is an AC power source.

29. The self-regulating electronic ballast system as recited in claim 28 including rectification means for providing full wave rectification of said power source AC voltage, said rectification means being coupled to said AC power source and said filter means.

30. The self-regulating electronic ballast system as recited in claim 29 where said rectification means includes a full wave bridge circuit.

* * * * *